(12) United States Patent  
Thäler et al.

(10) Patent No.: US 7,255,485 B2
(45) Date of Patent: Aug. 14, 2007

(54) OPTICAL PLUG-IN CONNECTION

(75) Inventors: Willi Thäler, Gossau (CH); David Vollenweider, Gossau (CH); Michael Columbus, Wangs (CH)

(73) Assignee: Huber+Suhner AG, Herisau (CH)

( * ) Notice: Subject to any disclaimer, the term of this patent is extended or adjusted under 35 U.S.C. 154(b) by 77 days.

(21) Appl. No.: 10/517,086

(22) PCT Filed: Apr. 2, 2003

(86) PCT No.: PCT/CH03/00212

§ 371 (c)(1),
(2), (4) Date: Aug. 16, 2005

(87) PCT Pub. No.: WO03/104870

PCT Pub. Date: Dec. 18, 2003

(65) Prior Publication Data

US 2006/0013539 A1    Jan. 19, 2006

(30) Foreign Application Priority Data

Jun. 6, 2002   (CH) ................................. 0959/02

(51) Int. Cl.
*G02B 6/38*     (2006.01)
*G02B 6/36*     (2006.01)

(52) U.S. Cl. ................. 385/60; 385/53; 385/55; 385/56; 385/58; 385/61; 385/62; 385/63; 385/64; 385/65; 385/66; 385/67; 385/68

(58) Field of Classification Search ............ 385/60–68, 385/53, 55, 56, 58
See application file for complete search history.

(56) References Cited

U.S. PATENT DOCUMENTS

| 4,898,446 | A | | 2/1990 | Hinckley |
| 5,129,023 | A | * | 7/1992 | Anderson et al. ............. 385/70 |
| 5,883,995 | A | | 3/1999 | Lu |
| 2005/0180697 | A1 | * | 8/2005 | De Marchi ................... 385/78 |

FOREIGN PATENT DOCUMENTS

EP   0570652 A   11/1993
EP   1072917 A   1/2001

* cited by examiner

*Primary Examiner*—Frank G. Font
*Assistant Examiner*—Jerry Martin Blevins
(74) *Attorney, Agent, or Firm*—The Webb Law Firm

(57)   ABSTRACT

An optical plug-in connection including: an optical plug-in connector; a coupling configured to receive the plug-in connector; and locking means for locking the plug-in connector in the coupling when the plug-in connector is inserted into the coupling, wherein the locking means are designed to prevent unintentional unlocking when in a locked state.

20 Claims, 8 Drawing Sheets

OPTICAL PLUG-IN CONNECTION

BACKGROUND OF THE INVENTION

1. Field of the Invention

The present invention relates to the field of fiber-optic technology and, more specifically, to an optical plug-in connection.

2. Description of the Related Art

In fiber-optic communications technology, use has long been made of optical plug-in connector systems in which two optical fibers are coupled to each other by two plug-in connectors, in each of which one of the fibers ends in a ferrule, being inserted from opposite sides into a coupling or an adapter in such a way that the ferrules slide from both sides into a guiding sleeve arranged in the coupling and butt with the end faces against each other. Plug-in connector systems of this type are known and marketed under the designation SC, LC, E-2000 (LSH) or LX.5.

In the known plug-in connections, use is usually made of locking devices by which the plug-in connector is locked when it is inserted into the coupling, so that it can only be pulled out of the coupling again after unlocking. In the case of a plug-in connection of the type E-2000 (LSH), as substantially described in EP-B1-0 570 652 cited at the beginning, a locking tongue is formed in the coupling and has a hook formed on its end as a locking element. When the plug-in connector is inserted, this hook locks in at an undercut in the plug-in connector and in this way holds the plug-in connector in the coupling. This locking can be released by the locking tongue being raised by a tilting lever which is arranged on the plug-in connector and can be operated from the outside.

In the case of a plug-in connection of the type LX.5, as substantially described in U.S. Pat. No. 5,883,995 cited at the beginning, a locking arm with an upwardly angled-away, hook-shaped locking element is formed on the plug-in connector itself. When the plug-in connector is inserted into the coupling, the locking element locks in at an undercut arranged on the upper side of the coupling and can be unlocked again by the locking arm being pressed downward in a portion located outside the coupling. A similar principle with a locking lever pivotably mounted on the plug-in connector is also realized in EP-A1-1 072 917 cited at the beginning.

In the case of the known plug-in connection systems described above, the locking mechanisms are formed in such a way that they can easily be unlocked by pressing a lever or the locking arm itself. This can easily also lead to unintentional disengagement of the locking and ultimately unintentional disconnection of the plug-in connector. This not only has the consequence that the fiber-optic connection is unwantedly interrupted at this point, but also leads to safety problems, because laser radiation of a hazardous intensity can possibly escape from the interrupted connection.

It is therefore desirable to have optical plug-in connections which do not exhibit the aforementioned disadvantages.

SUMMARY OF THE INVENTION

It is therefore the object of the invention to provide an optical plug-in connection of the type stated at the beginning in which unintentional release of the connection is ruled out with certainty.

The object is achieved by the features of claim 1 in their entirety. In principle, it would be conceivable for achieving the object to provide, on the plug-in connection, in addition to the locking means securing means which secure the connection against unintentional release independently of the locking means. However, this would have the consequence of separate locking means and securing means, which make the structural design and production of the plug-in connection more complicated and excessively expensive. The invention therefore takes a different approach: according to the invention, the locking means themselves are formed in such a way that they cannot be unintentionally unlocked when in the locked state.

According to a preferred refinement of the invention, this is achieved by the locking means being formed in such a way that, when in the locked state, they can only be unlocked by use of a separate tool. The user of plug-in connection must therefore deliberately use a separate tool to release the locking, so that unlocking requires a deliberate and considered action.

The invention is preferably realized in the case of plug-in connections in which the locking means comprise a flexibly bendable locking arm which is provided with a locking element at its free end and, bending in a flexible manner when the plug-in connector is inserted into the coupling, locks the plug-in connector in the coupling and can be unlocked by renewed flexible bending.

In principle, the locking arm may be arranged on the coupling. For simple implementation, however, it is particularly advantageous if the locking arm is arranged on the plug-in connector.

In a first preferred development, a locking element which can be moved back and forth by means of a tool between a first position, in which the locking arm can be flexibly bent largely unhindered, and a second position, in which the locking arm is hindered from flexible bending by the locking element, is provided on the plug-in connector, the locking arm in particular extending parallel to and at a distance from the housing of the plug-in connector, the locking arm being flexibly bent toward the housing of the plug-in connector for locking and unlocking, and the locking element being arranged between the locking arm and the housing of the plug-in connector.

In a development, the locking element is in this case displaceable parallel to the locking arm between the first position and the second position, it being guided in the longitudinal direction by means of a guiding rail and a guiding groove or a guiding slot and having protuberances or lugs, which protrude laterally beyond the locking arm and on which a tool formed in the manner of a fork can act for displacing the locking element.

In this case, the locking element may be produced from a plastic as a solid part, or it may be formed as a bent sheet-metal part. In the latter case, the locking element is preferably bent in a V-shaped manner, with a spring arm as one leg of the "V" and two parallel supporting arms, between which a guiding slot is arranged, as the other leg of the "V".

Or the locking element is pivotable between the first position and the second position about an axis perpendicular to the locking arm, the locking arm having arranged in it a clearance which at least partly receives the locking element during the flexible bending of the locking arm when it is located in the first position, but cannot receive the locking element when it is located in the second position, and it only being possible for the locking element to be pivoted by means of a tool, in particular in the form of a screwdriver.

In another preferred development, the locking arm can be flexibly bent by a formed-on unlocking lever, and the unlocking lever is chosen to be so short in its length that, when the plug-in connector is inserted in the coupling, it can only be actuated from the outside by means of a tool.

Further embodiments are provided by the dependent claims.

BRIEF DESCRIPTION OF THE DRAWINGS

The invention is to be explained in more detail below on the basis of exemplary embodiments in connection with the drawing, in which.

DESCRIPTION OF THE PREFERRED EMBODIMENTS

FIGS. 1 to 4 show a first preferred exemplary embodiment of an optical plug-in connection according to the invention, in which the locking arm provided for the locking on the plug-in connector can be blocked by a locking element, which can be pushed back and forth between a blocking position and a non-blocking position by means of a special tool.

Figure 1:
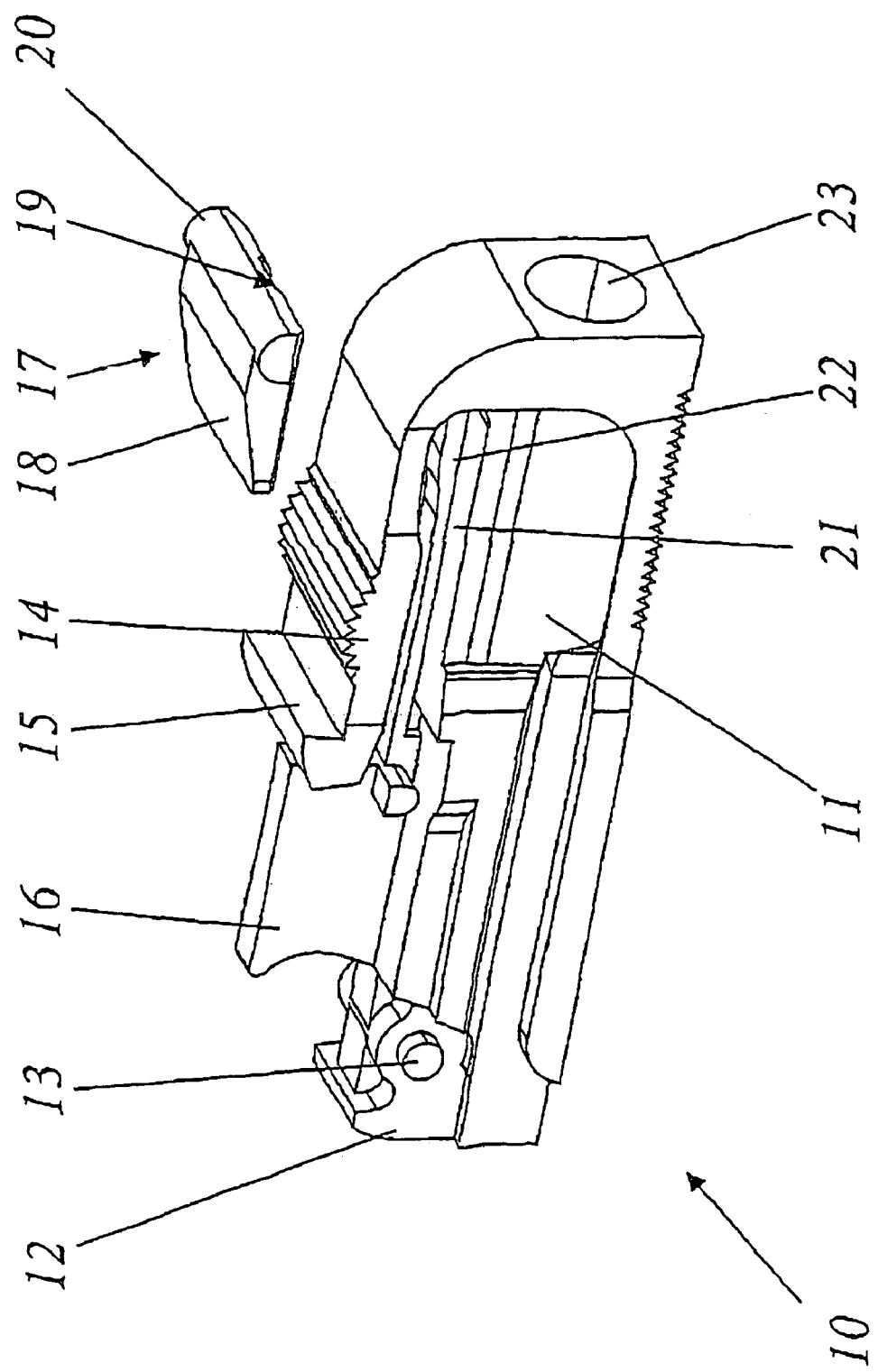
FIG. 1 shows in a perspective side view an optical plug-in connector with a locking element (separately represented) which can be displaced in the plugging direction for the locking arm according to a first preferred exemplary embodiment of the invention.
Figure 2:
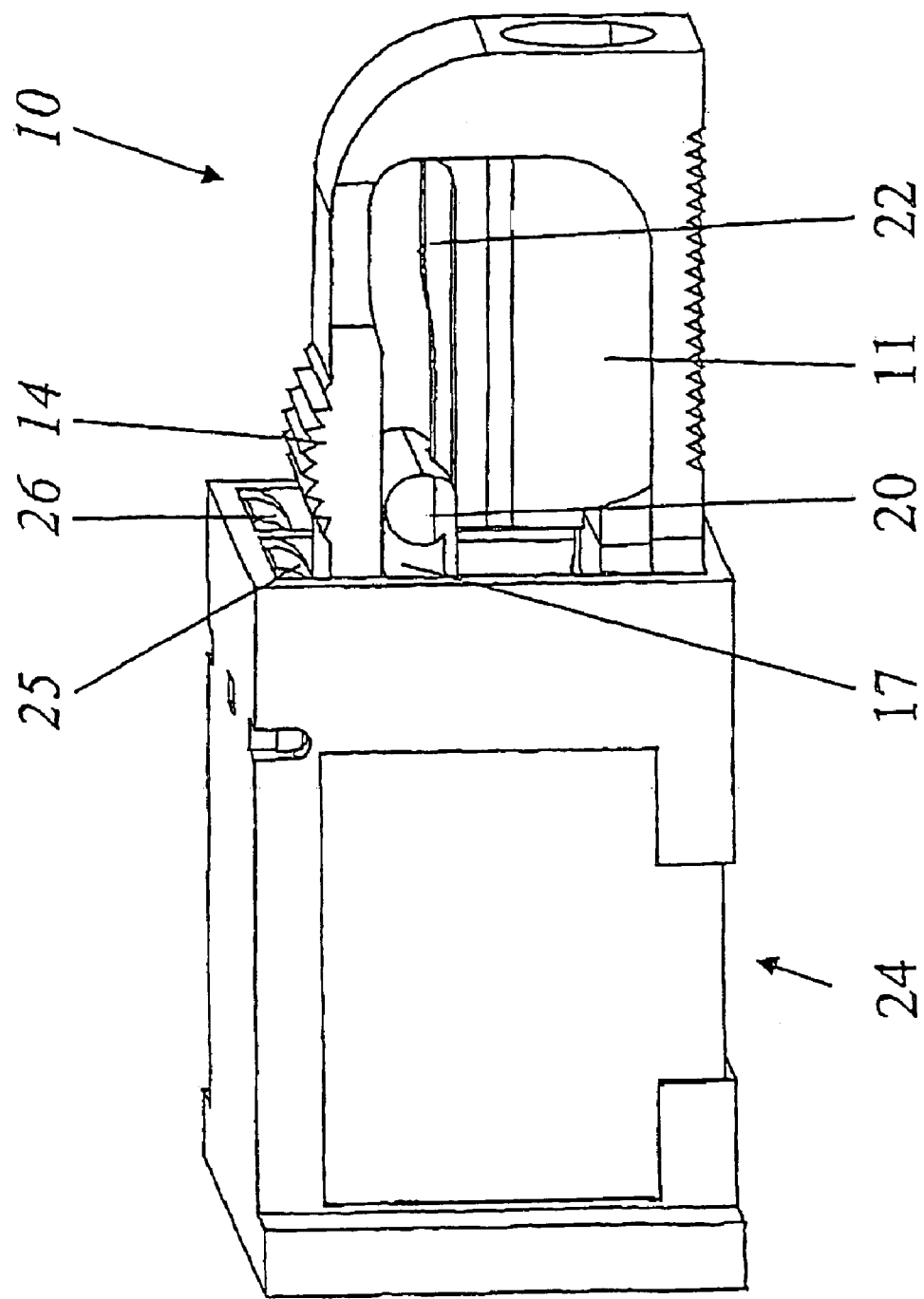
FIG. 2 shows the plug-in connector from FIG. 1 in the state in which it has been inserted into a duplex coupling and locked.

The plug-in connector 10 represented in FIG. 1 has an elongate housing 11 made of plastic, which extends in the plugging direction and has a through-bore, in the rear opening 23 of which the fiber-optic cable is inserted, and the front opening (not visible) of which, with the ferrule receiving the end of the fiber, is closed by a protective flap 12, which can be pivoted about a pivot axis 13 as far as a stop 16, as is described in more detail for example in U.S. Pat. No. 5,883,995 cited at the beginning.

Formed onto the housing at the rear end of the plug-in connector 10 is a locking arm 14, which extends forward with the free end parallel to and at a distance from the housing 11. Arranged at the free end of the locking arm 14 which can be flexibly bent toward the housing 11 is a locking element 15 in the form of an upwardly angled-away hook, which, when the plug-in connector 10 is inserted into a coupling 24 (FIGS. 2, 3), locks in behind an undercut that is inside the coupling 24 (see in comparison FIG. 15 of U.S. Pat. No. 5,883,995).

In the inserted state (FIGS. 2, 3), the plug-in of its housing 11 and with a rear part of the length of the locking arm 14 out of the coupling 24. For unlocking the locking arm 14 locked in the coupling 24, the locking arm 14 must be pressed downward in the direction of the housing 11, until the locking element 15 comes free from the undercut. In the case of the exemplary embodiment shown in FIGS. 1 to 4, a linearly displaceable locking element 17 which—depending on its position—blocks the locking lever 14 or releases it for unlocking is provided. According to FIG. 2 or 3, the locking element 17 that is separately represented in FIG. 1 is arranged in the intermediate space in such a way that it can be displaced in the plugging direction between the locking arm 14 and the housing 11. Guidance in the longitudinal direction is achieved by the locking element 17 sitting with a guiding groove 19 which is provided on the underside on a guiding rail 22 which runs in the longitudinal direction and protrudes out of a planar supporting surface 21 on the housing 11.

Protuberances 20, which protrude laterally beyond the locking arm 14 on both longitudinal sides, are provided at the rear end of the locking element 17. According to FIG. 4, a tool 27 formed in the or a fork for displacing the locking element 17 can act on these protuberances 20. The tool 27 has a stem 31, at the one end of which a handle 28 is fastened, and at the other end of which a fork 29 with a number of downwardly angled-away prongs 30 is arranged. Two adjacent prongs 30 are respectively at a distance from each other which is greater than the width of the locking arm 14, but less than the width of the locking element 17 in the region of the protuberances 20. If the coupling 24 is a duplex coupling with two insertion openings 25 and 26 lying next to each other, the fork 29 may be provided with more than two prongs 30, in order to be able simultaneously to lock or unlock two plug-in connectors 10 inserted next to each other.

Figure 3:
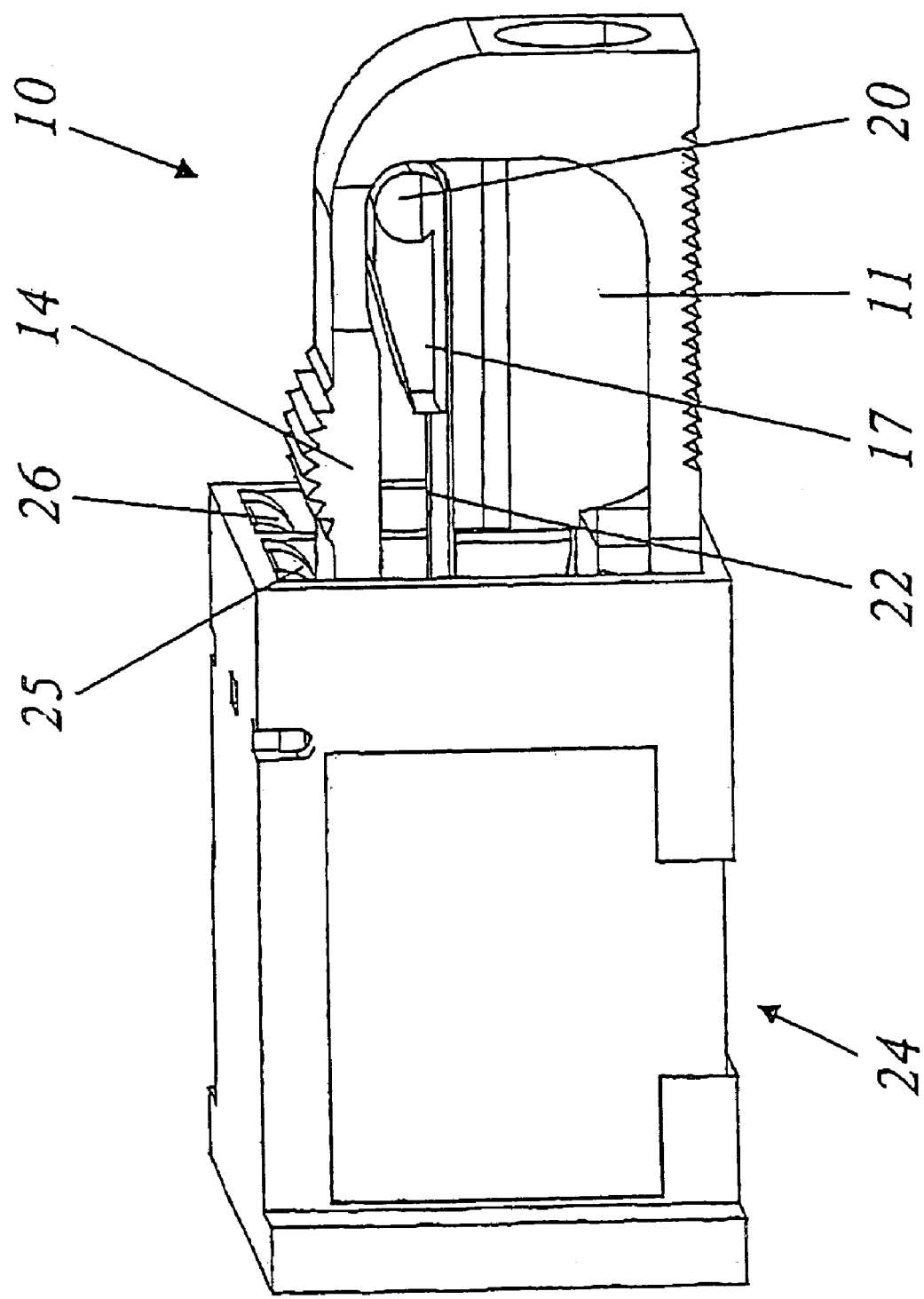
FIG. 3 shows the plug-in connector from FIG. 1 in the state in which has been inserted into a duplex coupling and unlocked.
Figure 4:
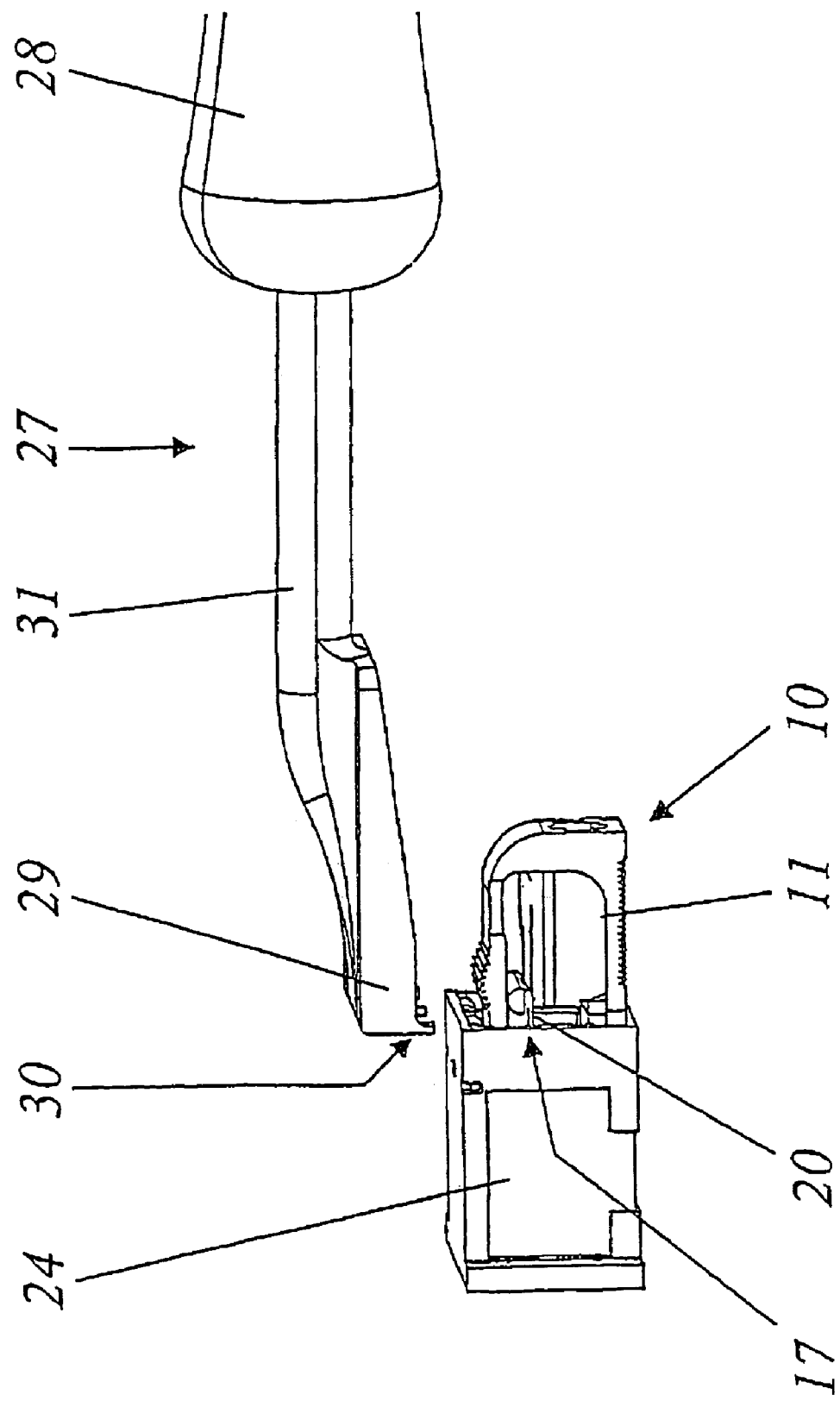
FIG. 4 shows the plug-in connection from FIG. 2 with a tool given by way of example for locking or unlocking the plug-in connector.

In a first position, represented in FIG. 3, the locking element 17 has been pushed fully to the rear. Since, during the flexible bending, the locking arm 14 has the greatest deflection at the front free end, while the deflection at the rear fixed end tends toward zero, with this positioning of the locking element 17 it can be bent, and consequently also locked and unlocked, largely unhindered. A slope 18 (FIG. 1) in the front region of the locking element 17 acts here against a possible limitation of the bending region. If, with the aid of the tool 27, the locking element 17 is displaced out of the first position, represented in FIG. 3, into the second position, depicted in FIGS. 2 and 4, the locking arm is locked, i.e. it can no longer be bent toward the housing 11. If the dimensions of the plug-in connector 10, and specifically of the locking arm, are chosen such that the locking element is displaced in a clamping manner into the second position, it remains fixed in this locking position and spontaneous return into the unlocking position is not possible. The height of the guiding rail 22 above the supporting surface 21 is preferably chosen such that on the one hand secure guidance is ensured, but on the other hand the locking element 17 can also be removed from the intermediate space between the locking arm 14 and the housing 11 when the locking arm 14 is bent outward sufficiently far.

The locking mechanism shown in FIGS. 1 to 4 relates to a locking arm which is formed or attached on the plug-in connector itself. It goes without saying that a comparable solution can also be provided within the scope of the invention for plug-in connections in which the beginning— the locking arm is arranged on the coupling. In such a case, a comparable, linearly displaceable locking element may either lock the locking arm directly at the coupling, or else lock the tilting lever which is attached to the plug-in connector and by which the locking arm can be raised out of its locking position for unlocking.

In the exemplary embodiment of FIGS. 1 to 4, the locking element 17 is produced from plastic as a solid part. However, it is also conceivable to use a locking element in the form of a bent sheet-metal part instead of the plastic injection-molded part. A corresponding exemplary embodiment is reproduced in FIGS. 8 to 10. The same parts are designated there by the same reference numerals as in FIGS. 1 to 4. The locking element 47 (FIG. 10) is bent in a V-shaped manner and has a spring arm 48 as the upper leg (of the lying "V") and two parallel supporting arms 49, 50, between which a guiding slot 51 remains free, as the lower leg. Laterally protruding lugs 52, 53, on which a fork-shaped tool 27 according to FIG. 4 can act, are arranged at the vertex of the "V". The arms 48-50 have at the free ends an inwardly directed rounded portion 54, in order to permit undisturbed sliding of the locking element 47 between the locking arm 14 and the housing 11 of the plug-in connector 10.

Figure 8:
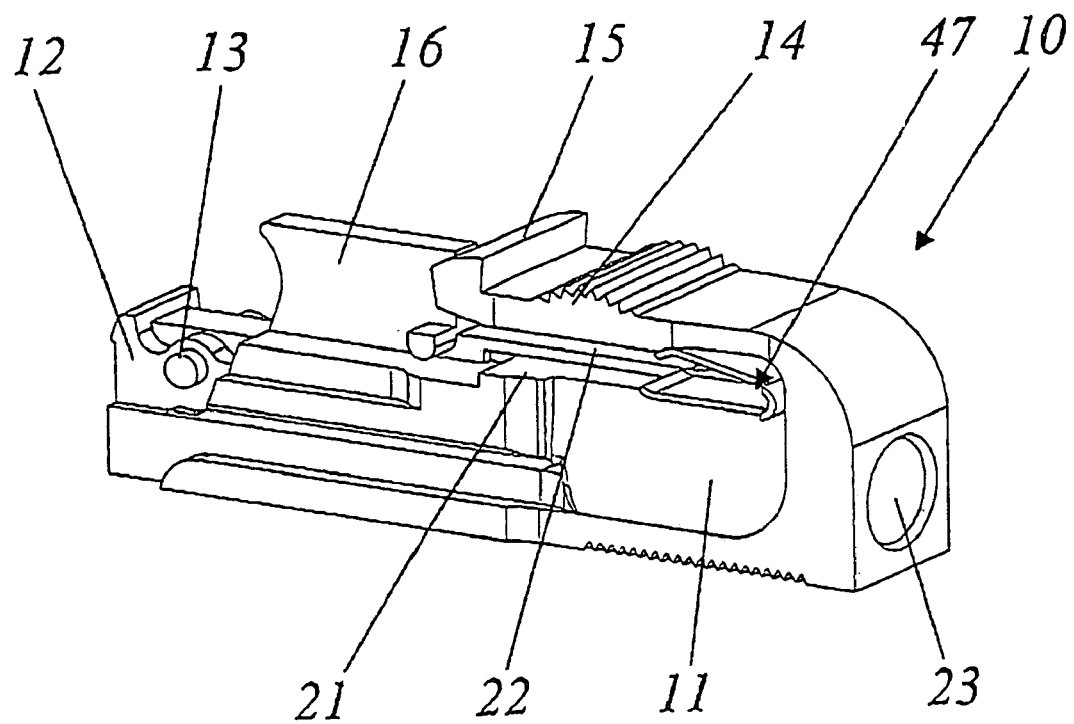
FIG. 8 shows in a representation comparable to FIG. 1 a plug-in connector with a locking element given as an alternative to FIG. 1 in the form of a bent sheet-metal part in the unlocked state.
Figure 9:
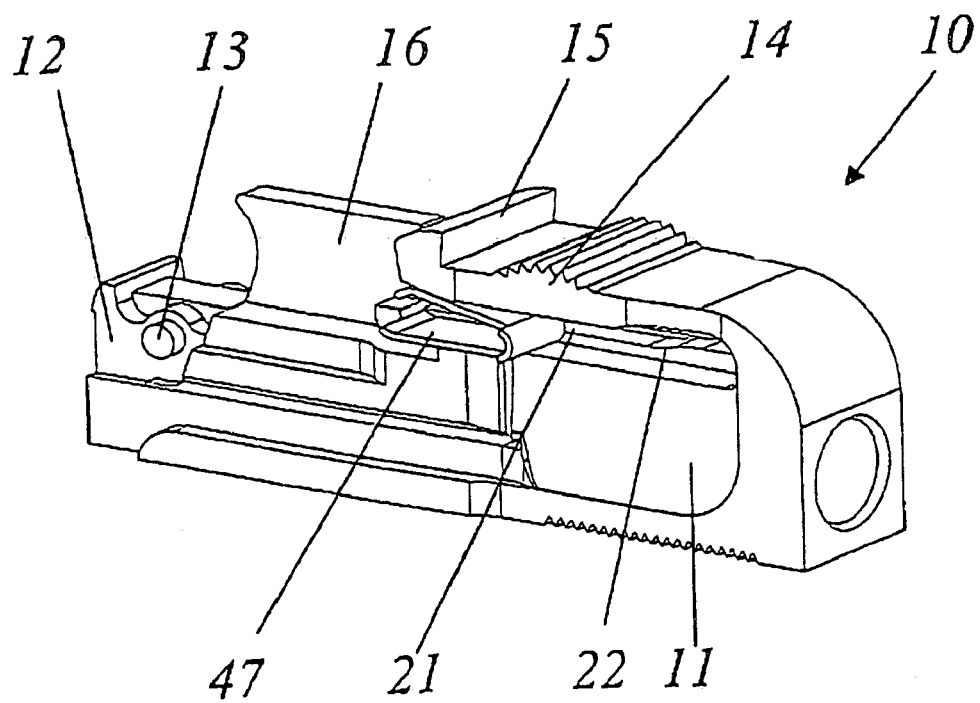
FIG. 9 shows the plug-in connector as shown in FIG. 8 in the locked state.
Figure 10:
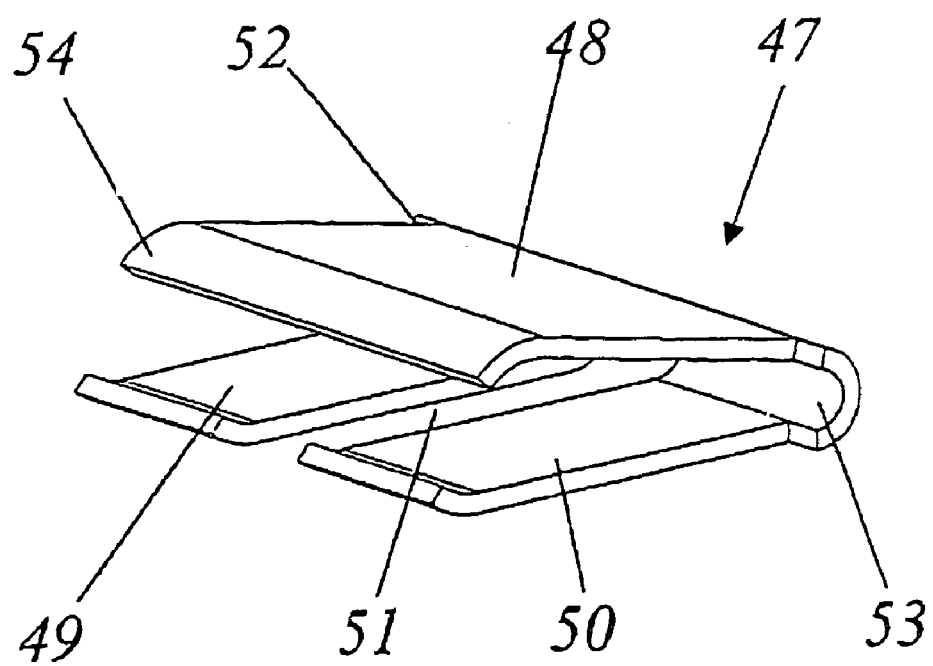
FIG. 10 shows the locking element from FIGS. 8, 9 as such.

As shown in FIGS. 8 and 9, the locking element 47 is mounted on the housing 11 displaceably in the plugging direction between the locking arm 14 and the supporting surface 21, the guiding rail 22 engaging in the guiding slot 51 and effecting longitudinal guidance. The locking element 47 rests with the supporting arms 49, 50 flat on the supporting surface 21 and butts with the free end of the spring arm 48 against the underside of the locking arm 14. With the formation of the locking configured in such a way that, irrespective of its position, a slight force always presses against the locking arm 14, and consequently the locking element 47 is secured against force-free or unintentional displacement. The locking element 47 must in this case be designed such that it cannot be compressed on one side. In addition, a depression may be provided in the housing 11 of the plug-in connector 10 in both end positions for the locking element 47, so that the locking element 47 locks in here.

Figure 5:
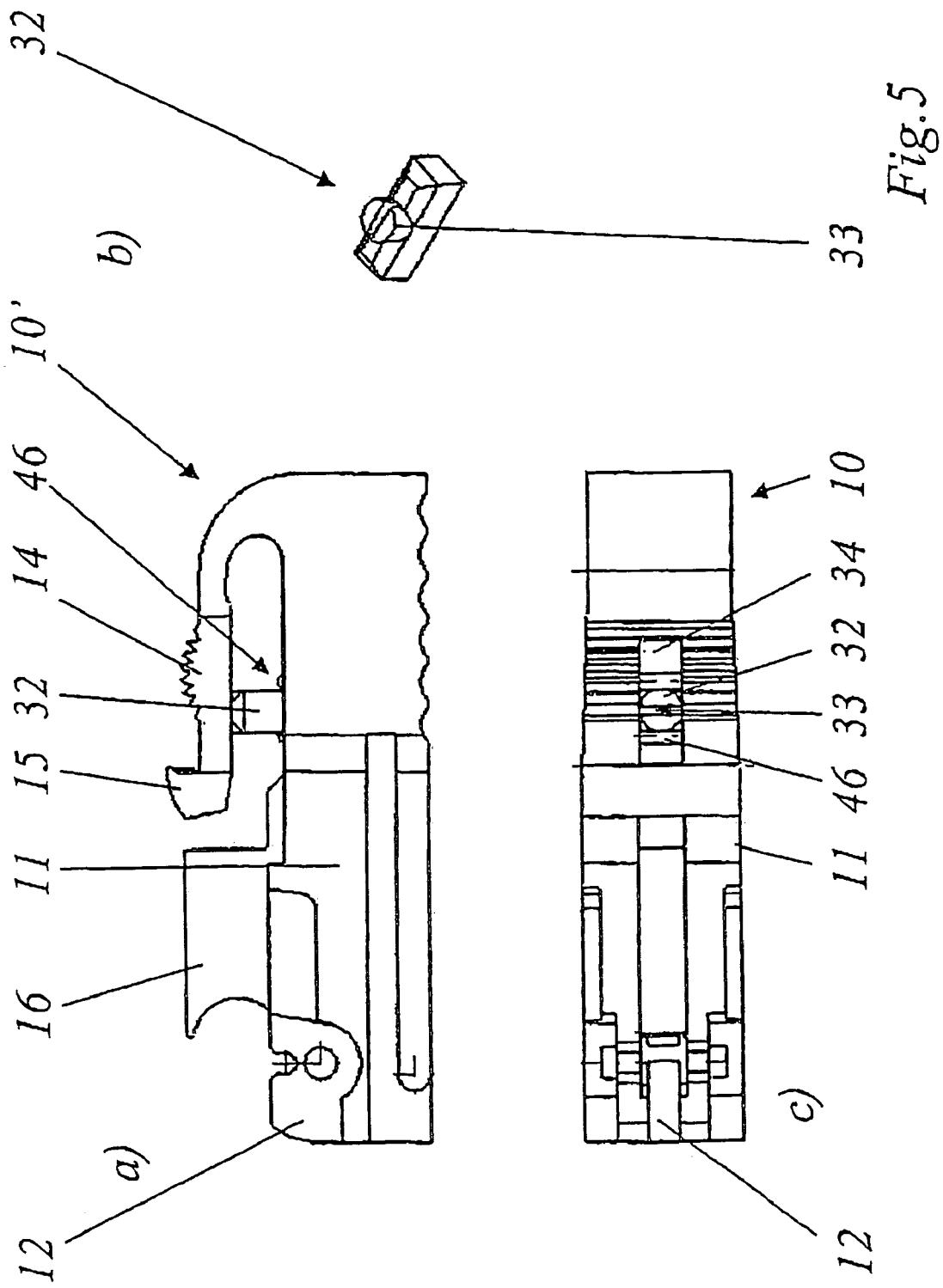
FIG. 5 shows in the view from the side (FIG. 5a) and from above (FIG. 5c) an optical plug-in connector with a pivotable locking element for the locking arm according to a second preferred exemplary embodiment of the invention, and also the associated locking element (FIG. 5b)

Another exemplary embodiment of a locking mechanism, which is based on a locking element movably arranged in the intermediate space between the locking arm 14 and the housing 11, is represented in FIGS. 5a to 5c. The plug-in connector 10' of this exemplary embodiment is largely identical to the plug-in connector 10 of FIGS. 1 to 4, so that the same reference numerals have also been used here for the same parts. The locking element 32 is in this case an elongate, substantially rectangular block, which has beveled edges on its upper side and in the center a vertically upright, cylindrical actuating element 33 with an engagement slot. The locking element 32 can be pivoted about a vertical axis out of a second position, in which it is oriented transversely in relation to the locking arm 14 (see FIG. 5c), into a first position, in which it is oriented parallel to the locking arm 14. Provided in the locking arm 14 is an elongate clearance 34, which extends in the plugging direction and can receive the locking element 32 to its full extent when it is in the second position, but by contrast does not allow it to be received—apart from the actuating element 32—when the locking element 32 is in the second position, shown in FIG. 5c. The actuating element 33 can be actuated, i.e. the locking element 32 can be pivoted, from above through the clearance 34 by means of a screwdriver.

The height of the locking element 32 is chosen such that the locking arm 14 rests on the locking element 32 and cannot be bent toward the housing 11 when the locking element 32 is located in the second position (FIG. 5c) or is situated transversely. If the locking element 32 is pivoted by 90° out of the second position into the first position by means of a screwdriver, or arranged parallel to the locking arm 14, the locking arm can be bent virtually freely downward, with the locking element 32 entering the clearance 34. For the pivotable mounting of the locking element 32 on the housing 11, a blind hole in which the locking element 32 engages with a pivot pin formed on it on the underside may be arranged in the housing 11, in the pivot axis of the locking element 32. However, on the housing 11 there may also be arranged, in the surface opposite the locking arm 14, parallel beads 46, between which the locking element 32 is fixed against lateral slipping.

Figure 6:
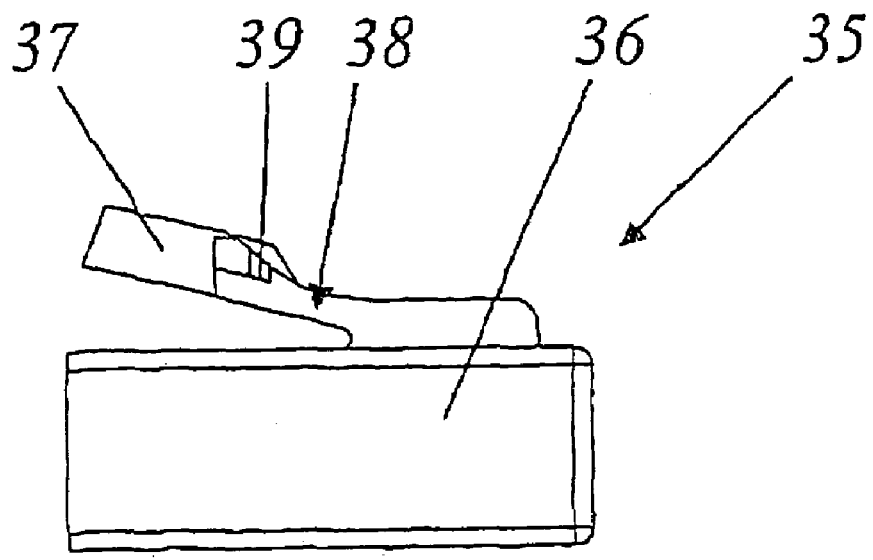
FIG. 6 shows a plug-in connector of the type LC with a shortened unlocking lever according to a further exemplary embodiment of the invention.
Figure 7:
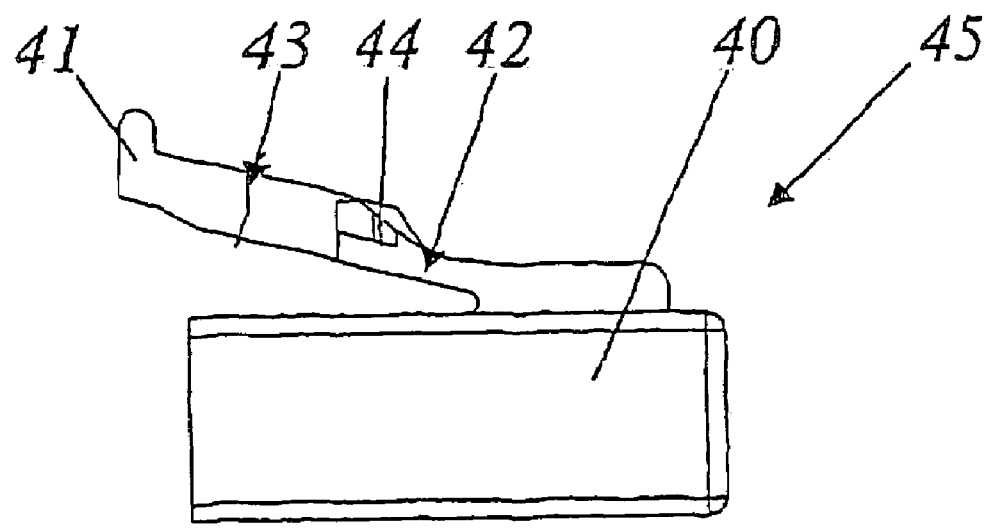
FIG. 7 shows a plug-in connector of the type LC with an unlocking lever which can be shortened at a predetermined breaking point according to a further exemplary embodiment of the invention.

An alternative type of locking within the scope of the invention is shown in the exemplary embodiments of FIGS. 6 and 7. Here, a plug-in connector 35 or 45 of the LC type, as described for example in U.S. Pat. No. 5,719,977, is taken as a basis. Formed on the upper side of the housing 36 or 40 of the plug-in connector 35 or 45 is a locking arm 38 or 42, which extends to the rear with the free end and has locking elements 39 or 44 for locking in an undercut provided on the coupling. The locking arm 38 or 42 goes over in an extension of the free end into an unlocking lever 37 or 41, which in the prior art protrudes out of the coupling and can be actuated (pressed down) for unlocking the plug-in connector. In the exemplary embodiment of FIG. 6, the unlocking lever 37 is designed from the outset to be so short that it does not protrude out of the coupling, but can only be pressed down by a tool (screwdriver or the like) being inserted into the coupling and acting on the oblique end face of the unlocking lever 37 lying inside the coupling. However, it is also conceivable, according to FIG. 7, to form the unlocking lever 41 initially with the customary length, but to provide a predetermined breaking point 43, at which the lever can be broken away and consequently shortened to the form represented in FIG. 6.

The invention claimed is:

1. An optical plug-in connection comprising:
   an optical plug-in connector;
   a coupling configured to receive the plug-in connector; and
   locking means for locking the plug-in connector in the coupling when the plug-in connector is inserted into the coupling, wherein the locking means are designed to prevent unintentional unlocking when in a locked state, wherein the locking means comprise a flexibly bendable locking arm having a first locking element situated at a free end of the locking arm, and wherein a second locking element situated on the plug-in connector is designed to move back and forth by means of a tool between a first position and a second position, wherein in the first position, the locking arm is designed to be flexibly bent unhindered, and wherein in the second position, the locking arm is hindered from flexible bending by the second locking element.

2. The plug-in connection as claimed in claim 1, wherein the locking means are designed to only be unlocked by use of the tool when in the locked state.

3. The plug-in connection as claimed in claim 1, wherein the locking arm is configured to bend when the plug-in connector is inserted into the coupling to lock the plug-in connector therein, wherein the plug-in connector is designed to be unlocked from the coupling by renewed flexible bending of the locking arm.

4. The plug-in connection as claimed in claim 3, wherein the locking arm is arranged on the plug-in connector.

5. The plug-in connection as claimed in claim 1, wherein the locking arm extends parallel to and spaced apart from a housing of the plug-in connector, wherein the locking arm is flexibly bent toward the housing of the plug-in connector for locking and unlocking, and wherein the second locking element is arranged between the locking arm and the housing of the plug-in connector.

6. The plug-in connection as claimed in claim 5, wherein the second locking element is designed to be removed when the locking arm is bent away and outward from the housing of the plug-in connector.

7. The plug-in connection as claimed in claim 5, wherein the second locking element is displaceable parallel to the locking arm between the first position and the second position.

8. The plug-in connection as claimed in claim 7, wherein the second locking element is guided in the longitudinal direction by means of a guiding rail and one of a guiding groove and a guiding slot.

9. The plug-in connection as claimed in claim 6, wherein the second locking element includes one of protuberances and lugs, wherein one of the protuberances and lugs protrudes laterally beyond the locking arm for co-acting with the tool for displacing the second locking element.

10. The plug-in connection as claimed in claim 6, wherein the coupling is designed as a duplex coupling for a simultaneous insertion of two plug-in connectors, and wherein the second locking elements of each plug-in connector are designed to be displaced simultaneously by the tool.

11. The plug-in connection as claimed in claim 5, wherein the second locking element is pivotable between the first position and the second position about an axis perpendicular to the locking arm.

12. The plug-in connection as claimed in claim 11, wherein the locking arm includes a clearance to partly receive the second locking element when the locking arm bends.

13. The plug-in connection as claimed in claim 9, wherein the tool includes a forked end.

14. The plug-in connection as claimed in claim 4, wherein the locking arm is designed to be flexibly bent by a formed-on unlocking lever, wherein the unlocking lever is sized in length such that when the plug-in connector is inserted in the coupling, the unlocking lever can only be actuated from the outside by the tool.

15. The plug-in connection as claimed in claim 14, wherein the unlocking lever is formed on the locking arm and has a fixed length.

16. The plug-in connection as claimed in claim 14, wherein the unlocking lever is formed on the locking arm and includes predetermined breaking points for shortening the length of the unlocking lever.

17. The plug-in connection as claimed in claim 9, wherein the second locking element is constructed of plastic as a solid piece.

18. The plug-in connection as claimed in claim 9, wherein the second locking element is formed as a bent sheet-metal piece.

19. The plug-in connection as claimed in claim 18, wherein the second locking element is bent in a V-shape having a spring arm as one leg of the "V" and two parallel supporting arms, between which a guiding slot is arranged, as the other leg of the "V".

20. The plug-in connection as claimed in claim 19, wherein the second locking element includes two laterally protruding lugs at the vertex of the "V" adapted to co-act with the tool.

* * * * *